US012165782B2

(12) United States Patent
Chen

(10) Patent No.: US 12,165,782 B2
(45) Date of Patent: Dec. 10, 2024

(54) METHOD FOR FORMING SQUARE-WIRE CONDUCTOR

(71) Applicant: HUI ZHOU HAIYUN ELECTRONICS CO., LTD., Guangdong (CN)

(72) Inventor: Wu Chen, Guangdong (CN)

(73) Assignee: HUI ZHOU HAIYUN ELECTRONICS CO., LTD., Guangdong (CN)

( * ) Notice: Subject to any disclaimer, the term of this patent is extended or adjusted under 35 U.S.C. 154(b) by 791 days.

(21) Appl. No.: 17/278,714

(22) PCT Filed: Sep. 18, 2020

(86) PCT No.: PCT/CN2020/116175

§ 371 (c)(1),
(2) Date: Mar. 23, 2021

(87) PCT Pub. No.: WO2021/057618

PCT Pub. Date: Apr. 1, 2021

(65) Prior Publication Data

US 2021/0237135 A1 Aug. 5, 2021

(30) Foreign Application Priority Data

Sep. 24, 2019 (CN) ......................... 201910903415.2

(51) Int. Cl.
*H01B 13/00* (2006.01)
*B21C 37/04* (2006.01)

(52) U.S. Cl.
CPC ..... *H01B 13/0006* (2013.01); *H01B 13/0003* (2013.01); *B21C 37/045* (2013.01); *Y10T 29/49117* (2015.01)

(58) Field of Classification Search
CPC .......... Y10T 29/49117; H01B 13/0292; H01B 7/0009; H01B 11/1808; H01B 13/00; H01B 13/0006
(Continued)

(56) References Cited

U.S. PATENT DOCUMENTS 5,174,013 A 12/1992 Hiroshima et al.
2004/0107758 A1 6/2004 Mikami et al.

FOREIGN PATENT DOCUMENTS

CA 2081593 A1 4/1994
CN 201242913 Y 5/2009
(Continued)

OTHER PUBLICATIONS

International Search Report for corresponding Chinese Patent Application No. PCT/CN2020/116175 dated Dec. 24, 2020.
(Continued)

*Primary Examiner* — Thiem D Phan
(74) *Attorney, Agent, or Firm* — Christensen, Fonder, Dardi PLLC; John P. Fonder; Peter S. Dardi

(57) ABSTRACT

Disclosed is a method for forming a square-wire conductor, which includes: providing a circular conductor with a diameter d; passing the conductor through a gap of a longitudinal calendering roller to longitudinally calender the conductor up and down to form a conductor with flat upper and lower surfaces, the gap L1 of the longitudinal calendering roller is 0.886 d to 0.911 d; longitudinally and transversely straightening the conductor; passing the conductor through a gap of a transverse calendering roller to transversely calender the conductor left and right to form a conductor with flat left and right surfaces, the gap L2 of the transverse calendering roller is 0.886 d to 0.911 d; and longitudinally and transversely straightening the conductor.

5 Claims, 2 Drawing Sheets

(58) Field of Classification Search
USPC .................................. 29/825, 605, 846, 882
See application file for complete search history.

(56) References Cited

FOREIGN PATENT DOCUMENTS

| | | | | |
|---|---|---|---|---|
| CN | 102360635 | A | | 2/2012 |
| CN | 203209466 | | * | 9/2013 |
| CN | 203209466 | U | | 9/2013 |
| CN | 203325570 | U | | 12/2013 |
| CN | 107240464 | A | | 10/2017 |
| CN | 206567343 | | * | 10/2017 |
| CN | 109215883 | A | | 1/2019 |
| CN | 208357527 | U | | 1/2019 |
| CN | 109702034 | A | | 5/2019 |
| CN | 110265192 | A | | 9/2019 |
| CN | 110743930 | A | | 2/2020 |
| GB | 2029302 | A | | 3/1980 |

OTHER PUBLICATIONS

Office Action for corresponding Chinese Patent Application No. 2019109034152 dated Aug. 11, 2020.
Written Opinion and International Search Authority for corresponding Chinese Patent Application No. PCT/CN2020/116175 dated Dec. 24, 2020.
Supplementary Search Report from corresponding European Patent Application No. 20855828.8, for PCT/CN2020/0116175, dated Apr. 19, 2022.
Office Action from corresponding Chinese Patent Application No. 2019109034152 dated Apr. 6, 2021.
Decision of Rejection from corresponding Chinese Patent Application No. 2019109034152 dated Aug. 31, 2021.

* cited by examiner

METHOD FOR FORMING SQUARE-WIRE CONDUCTOR

CROSS-REFERENCE TO RELATED APPLICATIONS

This application is a national stage filing under 35 U.S.C. § 371 of international application number PCT/CN2020/116175, filed Sep. 18, 2020, which claims priority to Chinese patent application No. 201910903415.2, filed Sep. 24, 2019. The contents of these applications are incorporated herein by reference in their entireties.

TECHNICAL FIELD

The present disclosure relates to the field of enameled wire technologies used in the electronic industry, and more particularly, to a method for forming a square-wire conductor.

BACKGROUND

An existing square-wire conductor is mainly used in motor and electrical industries, and is generally produced according to Standard MW1000:2008, and a minimum nominal size of a side length of the square-wire conductor is 1.628 mm. A wire drawing forming method is used in most of general forming methods, which has defects such as an excessively large specification, failure to meet development needs of an electronic technology, high costs, a complicated specification changing process, and the like. Specifications applied in an electronic industry are mostly small under current situations, and a nominal specification is generally 0.80 mm and below, especially a specification of 0.40 mm and below. It is almost difficult to manufacture a square-wire-drawing die, so that a square enameled wire cannot be produced, resulting in a problem that the square-wire conductor cannot be used on a large scale in the electronic industry, which needs to be solved urgently.

SUMMARY

The present disclosure aims to solve at least one of the technical problems in the prior art, and provides a method for forming a square-wire conductor, which can produce a stable and reliable fine square-wire, with an excellent product quality.

The technical solutions used in the present disclosure to solve the technical problems are as follows.

A method for forming a square-wire conductor includes the following steps of: step 1: providing a circular conductor with a diameter d; step 2: passing the conductor through a gap of a longitudinal calendering roller to longitudinally calender the conductor up and down to form a conductor with flat upper and lower surfaces, the gap L1 of the longitudinal calendering roller is 0.886 d to 0.911 d; step 3: longitudinally and transversely straightening the conductor; step 4: passing the conductor through a gap of a transverse calendering roller to transversely calender the conductor left and right to form a conductor with flat left and right surfaces, the gap L2 of the transverse calendering roller is 0.886 d to 0.911 d; and step 5: longitudinally and transversely straightening the conductor.

In accordance with some embodiments, the method further includes step 6: repeating the step 2 to the step 5 at least once.

In accordance with some embodiments, the gap of the longitudinal calendering roller for post-processing is smaller than the gap of the longitudinal calendering roller for prior-processing, and the gap of the transverse calendering roller for post-processing is smaller than the prior-processed gap of the transverse calendering roller.

In accordance with some embodiments, in the step 3 and the step 5, the conductor is wound on a tensioning wheel.

In accordance with some embodiments, step 1 specifically includes: paying off, by a pay-off reel, the circular conductor, and making the circular conductor have the diameter d after passing through a wire-drawing die.

In accordance with some embodiments, the method further includes the following step: taking up, by a take-up reel, the conductor.

The present disclosure has the beneficial effects as follows.

According to some embodiments of the present disclosure, by reasonably arranging the gaps of the longitudinal and transverse calendering rollers, the circular conductor with the diameter d is calendered into a square conductor, and is longitudinally and transversely straightened, thus effectively solving a problem that a fine square-wire with a nominal specification of 0.80 mm and below cannot be produced, so that a square enameled wire can be produced, thereby having advantages of stable and reliable production and excellent product quality, and thus a mass production effect can be achieved.

BRIEF DESCRIPTION OF THE DRAWINGS

The present disclosure is further described hereinafter with reference to the accompanying drawings and the specific embodiments, wherein.

DETAILED DESCRIPTION

In the description of the present disclosure, it shall be understood that, when orientation description is involved, the orientation or position relationship indicated by the terms “up”, “down”, “longitudinal”, “transverse”, “front”, “rear”, “left”, “right”, and the like is based on the orientation or position relationship shown in the accompanying drawings. The square or the square-wire in the present disclosure also includes a square or a square line with four corners being rounded corners/arc chamfers in a broad sense. It is only for the convenience of description of the present disclosure and simplification of the description, and it is not to indicate or imply that the indicated device or element must have a specific orientation, and be constructed and operated in a specific orientation. Therefore, the terms shall not be understood as limiting the present disclosure.

In the description of the present disclosure, “at least once” refers to one or more times, and “multiple times” refers to two or more times. It can be understood that a cross-sectional area of a conductor may inevitably be lost, worn, or axially stretched during calendering theoretically, but all of them are within the error. Therefore, the factors are not considered in the present disclosure for the moment, and only lossless deformation of the conductor on a same cross-section is considered in the present disclosure.

Figure 1:
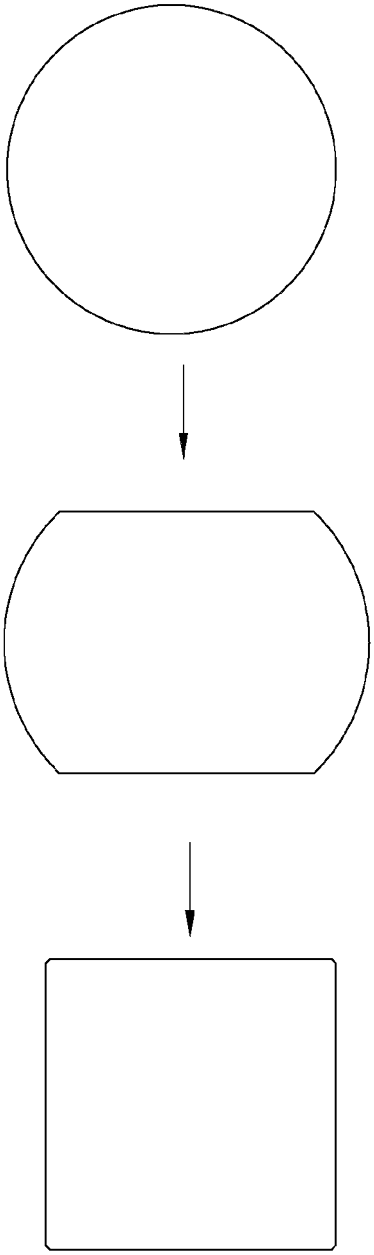
FIG. 1 is a schematic diagram of a forming process of a conductor according to Embodiment one of the present disclosure.
Figure 2:
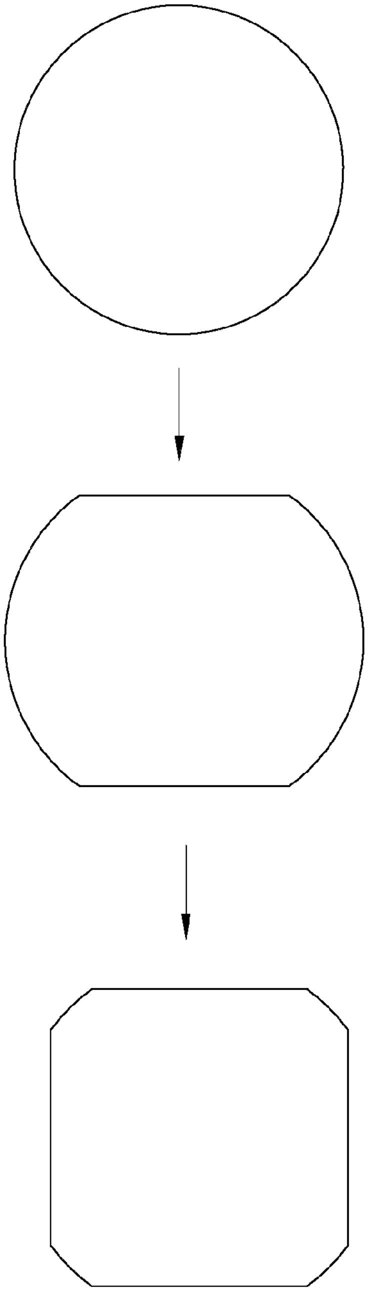
FIG. 2 is a schematic diagram of a forming process of a conductor according to Embodiment two of the present disclosure.

Referring to FIG. 1 and FIG. 2, a method for forming a square-wire conductor of the present disclosure includes the following steps of:

step 1: providing a circular conductor with a diameter d;

step 2: calendering the conductor up and down in a longitudinal direction through a gap of a longitudinal calendering roller to form a conductor with flat upper and lower surfaces, the gap L1 of the longitudinal calendering roller is 0.886 d to 0.911 d;

step 3: longitudinally and transversely straightening the conductor, step 4: calendering the conductor left and right in a transverse direction through a gap of a transverse calendering roller to form a conductor with flat upper and lower surfaces, the gap L2 of the transverse calendering roller is 0.886 d to 0.911 d; and step 5: longitudinally and transversely straightening the conductor.

According to the method, the circular conductor with the diameter d is calendered into a square conductor, and is longitudinally and transversely straightened, so that a problem that a fine square-wire with a nominal specification of 0.80 mm and below cannot be produced can be effectively solved, thereby being capable of producing a square enameled wire, having advantages of stable and reliable production and excellent product quality, and being capable of achieving a mass production effect.

The present disclosure has the following three embodiments for arrangement of the gaps of the longitudinal and transverse calendering rollers.

Embodiment One

Referring to FIG. 1, a method for forming a square-wire conductor provided by the present disclosure includes the following steps of:

step 1: providing a circular conductor with a diameter d;

step 2: passing the conductor through a gap of a longitudinal calendering roller to longitudinally calender the conductor up and down to form a conductor with flat upper and lower surfaces, the gap L1 of the longitudinal calendering roller is 0.886 d to 0.911 d;

step 3: longitudinally and transversely straightening the conductor;

step 4: passing the conductor through a gap of a transverse calendering roller to transversely calender the conductor left and right to form a conductor with flat left and right surfaces, the gap L2 of the transverse calendering roller is 0.886 d to 0.911 d; and step 5: longitudinally and transversely straightening the conductor.

In the embodiment of the disclosure, the gaps of the longitudinal and transverse calendering rollers are both 0.886 d, so that a conductor infinitely close to a standard square is finally obtained.

Embodiment Two

Referring to FIG. 2, the present disclosure also provides a method for forming a square-wire conductor, which is different from that in Embodiment one in that the gap L of the longitudinal rolling roller and the gap L2 of the transverse rolling roller are both 0.903 d, so that a finally obtained conductor has certain arc chamfers.

Embodiment Three

The present disclosure also provides a method for forming a square-wire conductor, which is different from that in Embodiment one in that the gap L of the longitudinal rolling roller and the gap L2 of the transverse rolling roller are both 0.911 d, so that a finally obtained conductor has maximumly allowable are chamfers, and a radius of the are chamfers is 0.25 L1.

According to the above three embodiments, three different shapes of square-wire conductors can be produced.

Embodiment Four

The present disclosure also provides a method for forming a square-wire conductor, which includes the following steps of:

step 1: paying off, by a pay-off reel, a circular conductor, and making the circular conductor have a diameter d after passing through a wire-drawing die;

step 2: passing the conductor through a gap of a longitudinal calendering roller to longitudinally calender the conductor up and down to form a conductor with flat upper and lower surfaces, the gap L1 of the longitudinal calendering roller is 0.886 d to 0.911 d;

step 3: longitudinally and transversely straightening the conductor, and winding the conductor on a tensioning wheel;

step 4: passing the conductor through a gap of a transverse calendering roller to transversely calender the conductor left and right to form a conductor with flat left and right surfaces, the gap L2 of the transverse calendering roller is 0.886 d to 0.911 d;

step 5: longitudinally and transversely straightening the conductor, and winding the conductor on a tensioning wheel;

step 6: repeating step 2 to step 5 at least once, making the gap of the longitudinal calendering roller for post-processing smaller than the gap of the longitudinal calendering roller for prior-processing, and making the gap of the transverse calendering roller for post-processing smaller than the prior-processed gap of the transverse calendering roller; and step 7: taking up, by a take-up reel, the conductor.

In the embodiment, the conductor is paid off by the pay-off reel and is finally taken up by the take-up reel, which is convenient and stable to produce, and the wire-drawing die may stably output the circular conductor with the diameter d. The conductor is longitudinally and transversely straightened to prevent deformation after calendering, and the conductor is wound on the tensioning wheel to keep a tension state.

Considering that the conductor may be slightly expanded in a transverse direction during longitudinal calendering, and may be slightly expanded in a longitudinal direction during transverse calendering, in order to minimize an error to the greatest extent, the longitudinal calendering and the transverse calendering are repeated at least once in the embodiment, and a single calendering action is decomposed into multiple processes. Moreover, the post-processed gaps of the longitudinal and transverse calendering rollers are respectively smaller than the prior-processed gaps of the longitudinal and transverse calendering rollers, so that a shape of the conductor is more and more close to a target. A very good effect may usually be achieved by repeating once or twice. Certainly, the more times the repetition is carried out, the better the effect is. It can be understood that basic requirements may also be reached without repeating the step 2 to the step 5.

The foregoing is only the preferred implementation manners of the present disclosure, but the present disclosure is not limited to the above embodiments. As long as it achieves the technical effect of the present disclosure by the same or similar means, it shall fall within the scope of protection of the present disclosure.

What is claimed is:

1. A method for forming a square-wire conductor, comprising:

step 1: providing a circular conductor with a diameter d;

step 2: passing the conductor through a gap of a longitudinal calendering roller to longitudinally calender the conductor up and down to form a conductor with flat upper and lower surfaces, wherein the gap L1 of the longitudinal calendering roller is 0.911 d;

step 3: longitudinally and transversely straightening the conductor;

step 4: passing the conductor through a gap of a transverse calendering roller to transversely calender the conductor left and right to form a conductor with flat left and right surfaces, wherein the gap L2 of the transverse calendering roller is 0.911 d; and step 5: longitudinally and transversely straightening the conductor;

wherein the method further comprises step 6: repeating step 2 to step 5 at least once, such that a finally obtained square-wire conductor has four corners being arc chamfers, and a radius of the arc chamfers is 0.25 L1, and the square-wire conductor has a normal specification of 0.80 mm and below;

wherein the gap of the longitudinal calendering roller for post-processing is smaller than the gap of the longitudinal calendering roller for prior-processing, and the gap of the transverse calendering roller for post-processing is smaller than the prior-processed gap of the transverse calendering roller;

wherein the conductor is expanded in a transverse direction during longitudinal calendering, and is expanded in a longitudinal direction during transverse calendering.

2. The method of claim 1, wherein in step 3 and step 5, the conductor is wound on a tensioning wheel.

3. The method of claim 2, further comprising the following step: taking up, by a take-up reel, the conductor.

4. The method of claim 1, wherein step 1 comprises: paying off, by a pay-off reel, the circular conductor, and making the circular conductor have the diameter d after passing through a wire-drawing die.

5. The method of claim 1, further comprising the following step: taking up, by a take-up reel, the conductor.

* * * * *